(12) United States Patent
Cheng et al.

(10) Patent No.: US 10,983,317 B2
(45) Date of Patent: Apr. 20, 2021

(54) COMPACT, LIGHTWEIGHT OPTICAL IMAGING SYSTEM HAVING FREE-FORM SURFACE AND COMMON OPTICAL AXIS DIRECTION

(71) Applicant: SUZHOU NED+AR TCOE TECHONOLGY CO., LTD., Suzhou (CN)

(72) Inventors: Dewen Cheng, Suzhou (CN); Qiwei Wang, Suzhou (CN)

(73) Assignee: SUZHOU NED+AR TCOE TECHONOLGY CO., LTD., Suzhou (CN)

( * ) Notice: Subject to any disclaimer, the term of this patent is extended or adjusted under 35 U.S.C. 154(b) by 242 days.

(21) Appl. No.: 16/336,459

(22) PCT Filed: Jul. 4, 2017

(86) PCT No.: PCT/CN2017/091739
§ 371 (c)(1),
(2) Date: Mar. 25, 2019

(87) PCT Pub. No.: WO2019/006672
PCT Pub. Date: Jan. 10, 2019

(65) Prior Publication Data
US 2019/0227287 A1  Jul. 25, 2019

(51) Int. Cl.
*G02B 17/08* (2006.01)
*G02B 27/00* (2006.01)
(Continued)

(52) U.S. Cl.
CPC ......... *G02B 17/08* (2013.01); *G02B 17/0816* (2013.01); *G02B 27/0081* (2013.01);
(Continued)

(58) Field of Classification Search
CPC .......................... G02B 17/08; G02B 17/0816; G02B 27/0172; G02B 27/0081; G02B 27/144; G02B 2027/015
(Continued)

(56) References Cited

U.S. PATENT DOCUMENTS

| | | | |
|---|---|---|---|
| 5,822,127 | A | 10/1998 | Chen et al. |
| 7,352,521 | B2 | 4/2008 | Matsunaga |

(Continued)

FOREIGN PATENT DOCUMENTS

| | | |
|---|---|---|
| CN | 106664400 A | 10/2017 |
| JP | 2001174747 A | 6/2011 |

OTHER PUBLICATIONS

RO 101 of PCT/CN2017/091739.
(Continued)

*Primary Examiner* — Mohammed A Hasan
(74) *Attorney, Agent, or Firm* — Dragon Sun Law Firm, PC; Jinggao Li, Esq.

(57) ABSTRACT

An optical imaging system having a free-form surface includes an image source for generating image light, a lens assembly for reflecting the image light incident thereon, a first reflective surface, a second reflective surface, and a beam splitter that are disposed opposite to each other. The present disclosure allows the image light to pass through the lens assembly twice, reduces the weight of the optical system, and makes the system structure more compact, thus providing an optical imaging system featuring low distortion, high image quality, and a compact structure. A reflective surface is disposed between the image source and the lens assembly, so that the distance between the image source and the lens assembly can be reduced. The second reflective surface is designed as a free-form surface and a first lens and a second lens are aspheric lenses.

20 Claims, 8 Drawing Sheets

(51) Int. Cl.
*G02B 27/14* (2006.01)
*G02B 27/01* (2006.01)

(52) U.S. Cl.
CPC ....... *G02B 27/0172* (2013.01); *G02B 27/144* (2013.01); *G02B 2027/015* (2013.01)

(58) Field of Classification Search
USPC .......................................................... 359/629
See application file for complete search history.

(56) References Cited

U.S. PATENT DOCUMENTS

| | | |
|---|---|---|
| 9,366,864 B1 | 6/2016 | Brown et al. |
| 2003/0164901 A1* | 9/2003 | Ouchi .................... H04N 9/315 |
| | | 348/744 |

OTHER PUBLICATIONS

Written Opinion of the International Search Authority of PCT/CN2017/091739.
International Search Report of PCT/CN2017/091739.

* cited by examiner

FIG. 8

COMPACT, LIGHTWEIGHT OPTICAL IMAGING SYSTEM HAVING FREE-FORM SURFACE AND COMMON OPTICAL AXIS DIRECTION

CROSS-REFERENCE TO RELATED APPLICATIONS

This application is a national stage application of PCT Application No. PCT/CN2017/091739. This Application claims priority from PCT Application No. PCT/CN2017/091739, filed Jul. 4, 2017, the content of which is incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

This present disclosure relates to the field of optics, and in particular relates to an optical imaging system having a free-form surface and suitable for a head-mounted display.

BACKGROUND

With the development of display technologies, virtual reality (VR) and augmented reality (AR) technologies have become increasingly mature, and head-mounted displays (HMDs) for implementing these technologies have also been developed. A head-mounted display is generally mounted on the head of an observer and therefore needs to have a compact and lightweight structure to reduce the burden on the viewer. However, to achieve a better visual observation effect, the head-mounted display relies on its key component, i.e., optical system, to obtain good imaging quality and a large field of view. To achieve a good optical effect, complicated optical devices are required to improve the optical imaging quality and the field of view, which is not conducive to reducing the weight and increasing the compactness of the head-mounted display. The structural size of the optical system directly affects the size and weight of the head-mounted display, and the imaging quality of the optical system directly affects the display effect of the head-mounted display. In addition, the head-mounted display needs to obtain a large field of view and exit pupil diameter, to allow a user to observe a larger area within a short distance, and to adapt to the observation effects under different pupil distances.

Therefore, how to design an optical system having a small volume, high image quality, and a large field of view becomes a technical problem to be urgently resolved in the prior art. A heretofore unaddressed need exists in the art to address the aforementioned deficiencies and inadequacies.

SUMMARY

An objective of the present disclosure is to provide an optical imaging system having a free-form surface and featuring low distortion, high image quality, and a compact structure. The optical imaging system has a large field of view and a large exit pupil diameter, does not occupy much space in front of the eyes of a wearer, and therefore is suitable for a head-mounted display.

To achieve this objective, the following technical solutions are used in the present disclosure:

An optical imaging system includes a lens assembly having a first optical axis direction, a first reflective surface, a second reflective surface, and a beam splitter, where the lens assembly includes a front surface and a rear surface, where the front surface is close to an image source, the rear surface has a reflective surface, image light from the image source is incident to the lens assembly through the front surface and propagates to the rear surface, and after being reflected by the rear surface, the image light propagates to the front surface; and after exiting from the front surface, the image light is incident on the first reflective surface;

the first reflective surface is disposed opposite to the lens assembly, and is configured to reflect the image light exiting from the lens assembly;

the beam splitter is disposed opposite to the first reflective surface, and is configured to transmit and reflect the image light incident thereon from the first reflective surface at a predetermined transmission-reflection split ratio; and the second reflective surface has a second optical axis direction, is disposed opposite to the beam splitter and located on the same side as the first reflective surface, and is configured to reflect the image light incident thereon from the beam splitter, and cause the image light to be incident to the beam splitter again.

Optionally, the lens assembly includes a first lens and a second lens, the first lens includes a first lens surface and a second lens surface, the second lens includes a third lens surface and a fourth lens surface, the front surface of the lens assembly is the first lens surface, the rear surface is the fourth lens surface, and the fourth lens surface is coated with a total reflection film as the reflective surface, or a rear side of the fourth lens surface is provided with a reflection plate as the reflective surface.

Optionally, the first lens and the second lens of the lens assembly are aspheric lenses.

Optionally, the first lens and the second lens are connected to each other with glues.

Optionally, the second reflective surface is designed as a free-form surface, and an inner surface thereof facing the beam splitter is provided with a beam splitting layer with a predetermined transmission-reflection ratio to reflect the image light.

Optionally, the first reflective surface is designed as a free-form surface or is a planar mirror.

Optionally, an angle between the first optical axis direction and the second optical axis direction does not exceed 45 degrees.

Optionally, the optical imaging system has an exit pupil diameter ranging from 4 mm to 10 mm and has an exit pupil distance greater than 10 mm.

Optionally, the optical imaging system has a negative focal power, the lens assembly with a positive focal power includes a positive refractive lens and a negative refractive lens, and the second reflective surface has a positive focal power.

The present disclosure further discloses a head-mounted display device, including the foregoing optical imaging system and an image source for emitting image light to the optical imaging system.

Optionally, a third reflective surface exists between the image source and the lens assembly, and the third reflective surface is configured to reflect the image light emitted by the image source into the lens assembly.

Optionally, the image source and the lens assembly are arranged in one dimension along a given direction.

Optionally, the third reflective surface is arranged in two dimensions relative to the image source and the lens assembly.

Optionally, the second reflective surface and the third reflective surface are connected together through splicing.

Optionally, the image source is one selected from the group consisting of an organic light-emitting diode (OLED) display, a backlit liquid-crystal display (LCD) display, a micro light-emitting diode (LED) display, a plasma display, and a digital light processing (DLP) display.

In conclusion, the present disclosure allows the image light to pass through the lens assembly twice, and utilizes the optical correction capability of the lens assembly twice, thereby effectively reducing the number of components of the optical system and reducing the weight. Further, a reflective surface is disposed between the image source and the lens assembly, so that the distance between the image source and the lens assembly can be reduced, making the system more compact. Because the second reflective surface is designed as a free-form surface and the first lens and the second lens are aspheric lenses, the optical design flexibility is increased, and the imaging quality of the optical system having a free-form surface of the present disclosure is improved. Assembly errors of the optical system can also be reduced.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

LIST OF REFERENCE NUMERALS 1. optical imaging system; 2. image source; 3. lens assembly; 4. first lens; 4A. first lens surface; 4B. second lens surface; 5. second lens; 5A. third lens surface; 5B. fourth lens surface; 6. first reflective surface; 7. second reflective surface; 8. beam splitter; 9. third reflective surface; and 10. image light.

DETAILED DESCRIPTION

The following further describes the present disclosure in detail with reference to the accompanying drawings and embodiments. Same reference numerals refer to same components throughout the specification. Unless otherwise explicitly indicated, it should be understood by a person skilled in the art that terms such as first and second are only used for distinguishing different components and are not to be construed as indicating ordinal positions. In addition, the component structure referred to as first portion may vary with different embodiments. The descriptions of specific embodiments are merely used for interpreting the present disclosure and are not intended to limit the present disclosure. It should also be noted that for ease of description, only some but not all of the structures related to the present disclosure are shown in the accompanying drawings.

Embodiment 1

Figure 1:
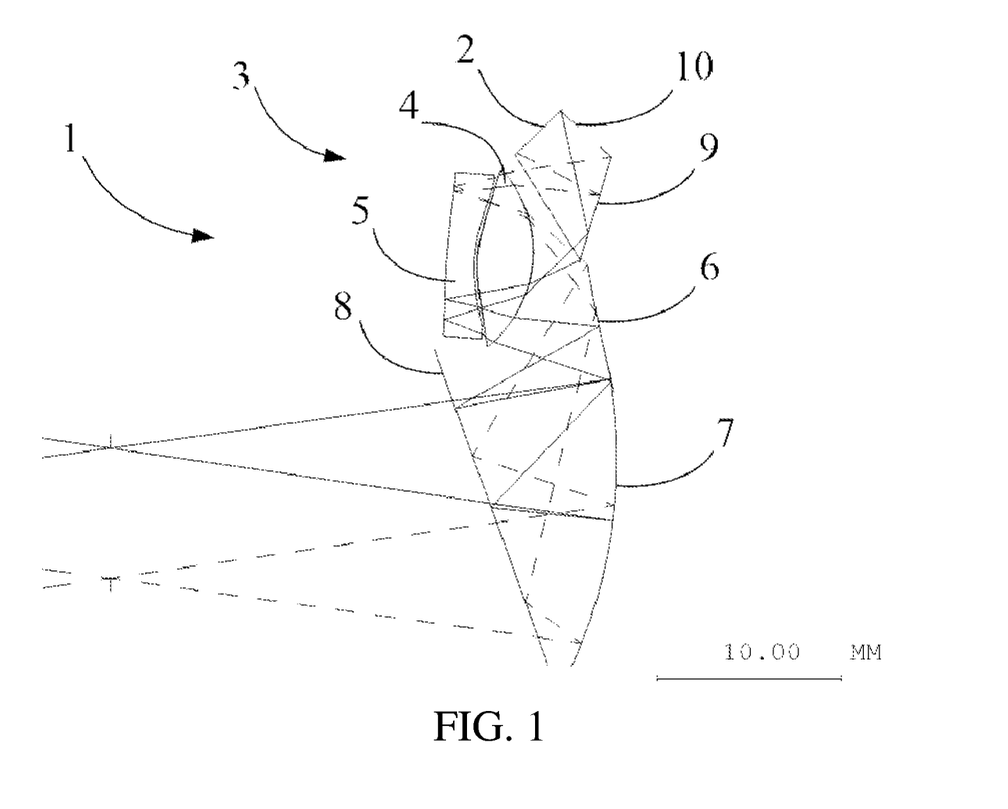
FIG. 1 is an optical path diagram of an optical imaging system having a free-form surface according to Embodiment 1 of the present disclosure.

FIG. 1 shows an optical imaging system having a free-form surface. The optical imaging system is suitable for a head-mounted display. The optical imaging system 1 includes a lens assembly 3 having a first optical axis direction, a first reflective surface 6, a second reflective surface 7, a beam splitter 8, and a third reflective surface 9. An image source 2 is configured to emit image light to the optical imaging system.

Figure 2:
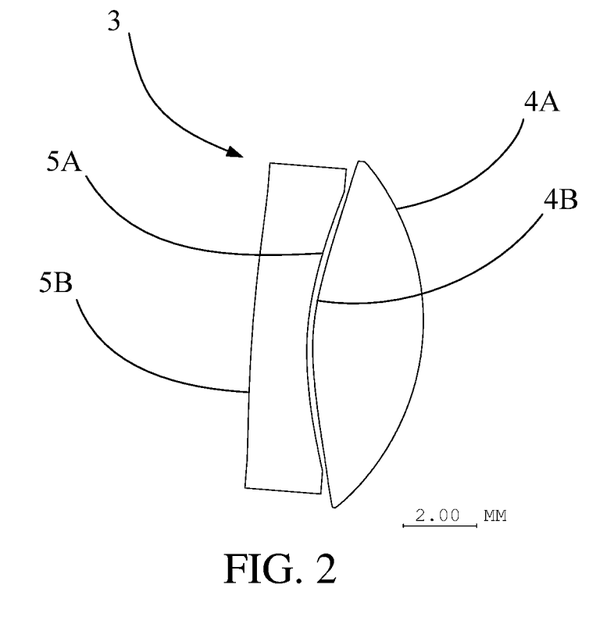
FIG. 2 is a schematic diagram of a lens assembly of the optical imaging system shown in FIG. 1.

FIG. 2 is a schematic diagram of a lens assembly of the optical imaging system shown in FIG. 1. Along a beam incident direction, the lens assembly includes a front surface 4A and a rear surface 5B. The front surface 4A is close to the image source 2. The rear surface 5B has a reflective surface. The image light from the image source 2 is incident to the lens assembly through the front surface 4A and propagates to the rear surface 5B. After being reflected by the rear surface 5B, the image light passes through the lens assembly again, exits from the front surface 4A, and is incident on the first reflective surface 6.

The first reflective surface 6 is disposed opposite to the lens assembly 3, and is configured to reflect the image light 10 exiting from the lens assembly 3.

The beam splitter 8, which is, for example, a half mirror or a beam splitter with a predetermined transmission-reflection split ratio according to light energy utilization requirements, is disposed opposite to the first reflective surface 6, and is configured to partially reflect the image light 10 incident thereon from the first reflective surface 6.

The second reflective surface 7 has a second optical axis direction, is disposed opposite to the beam splitter 8 and located on the same side as the first reflective surface 6, and is configured to reflect the image light 10 incident thereon from the beam splitter 8 and cause the image light 10 to be incident to the beam splitter 8 again.

In a specific structure, the lens assembly 3 includes a first lens 4 and a second lens 5, the first lens 4 includes a first lens surface 4A and a second lens surface 4B, and the second lens 5 includes a third lens surface 5A and a fourth lens surface 5B. In the lens assembly, the first lens surface 4A is the front surface, the fourth lens surface 5B is the rear surface. The fourth lens surface 5B is coated with a total reflection film as the reflective surface, or a rear side of the fourth lens surface is provided with a reflection plate as the reflective surface.

The image source 2 is configured to generate the image light 10 modulated based on an image signal. The image light 10 is incident to the lens assembly 3 at an appropriate angle, for example, obliquely incident to the lens assembly 3. The image light 10 emitted by the image source 2 is incident to the lens assembly 3 through the first lens surface 4A, passes through the first lens 4 and the second lens 5, and propagates to the fourth lens surface 5B. After being reflected by the fourth lens surface 5B, the image light 10 passes through the lens assembly 3 again, exits from the first lens surface 4A, and is incident on the first reflective surface 6.

Therefore, it can be seen from FIG. 1 and FIG. 2 that, in this embodiment, the image source 2 generates the image light 10 modulated based on the image signal, and the image light 10 is reflected by the third reflective surface 9 to the lens assembly 3. The image light 10 is incident on the first lens surface 4A of the lens assembly 3, passes through the lens 4 and the lens 5, and propagates to the fourth lens surface 5B. After being reflected by the fourth lens surface 5B, the image light 10 passes through the first lens 4 and the second lens 5 again, propagates to the first lens surface 4A, and exits from the first lens surface 4A. The image light 10 passing through the lens assembly 3 is incident on the first reflective surface 6, and is reflected to the beam splitter 8. Part of the image light 10 is reflected by the beam splitter 8 to the second reflective surface 7, is then reflected by the second reflective surface 7 to the beam splitter 8 again, and finally propagates through the beam splitter 8 to human eyes for imaging.

Compared with the prior art, in Embodiment 1 of the present disclosure, the reflective surface is disposed on the fourth lens surface 5B of the second lens 5. The image light 10 passes through the lens assembly 3 twice, and the optical correction capability and refractive power of the lens assembly 3 are utilized twice. Therefore, provided that the same number of optical elements are used, the technical solution of the present disclosure improves the optical correction capability and refractive power compared with the prior art.

Provided that the same optical correction capability needs to be obtained, the present disclosure requires less lenses compared with the prior art, thereby reducing the weight and making the system structure more compact. The reflective surface may be disposed, for example, by using a coating process. Therefore, an optical imaging system featuring small distortion, high image quality, and a compact structure can be provided for head-mounted displays.

In Embodiment 1 of the present disclosure, the lens assembly 3 is of an aspheric design, that is, the first lens and the second lens of the lens assembly are aspheric lenses. Therefore, the optical design flexibility can be increased, and the imaging quality of the optical imaging system having a free-form surface of the present disclosure can be improved.

The first reflective surface 6 and the second reflective surface 7 are designed as free-form surfaces to control the reflecting angles so that a sufficiently large field of view is achieved and aberration of the optical system is reduced, thereby further improving the imaging quality. An inner surface of the second reflective surface facing the beam splitter is provided with a beam splitting layer with a predetermined transmission-reflection ratio to reflect the image light.

In this embodiment, the first reflective surface 6 and the second reflective surface 7 are both designed as free-form surfaces. However, this is merely an example. In the present disclosure, to increase the field of view, reduce the aberration, and improve the optical quality, only the second reflective surface 7 needs to be designed as a free-form surface. In addition, because only a part of the reflective surface on the side opposite to the beam splitter 8 is of a free-form surface design, the optical path design is simplified, and costs of the optical imaging system are reduced. In this case, the first reflective surface 6 may be a planar mirror.

Further, to reduce space occupied in front of the eyes of the user in the line-of-sight direction, in Embodiment 1, the first optical axis direction and the second optical axis direction are preferably substantially the same, so that image sources of slightly different sizes can all be applied to the optical path of this embodiment without occupying additional space in the line-of-sight direction. In this way, the angle between the optical axis directions can be slightly increased to approximately not more than 45 degrees, to further increase the effective length of the optical system, thereby increasing the field of view and alleviating image distortion.

Further, in Embodiment 1 of the present disclosure, the third reflective surface 9 is disposed between the image source 2 and the lens assembly 3. The third reflective surface 9 is configured to reflect the image light 10 emitted by the image source 2 into the lens assembly 3. Therefore, with the use of the third reflective surface, the positions of optical devices can be adjusted more flexibly, and the distance between the image source 2 and the lens assembly 3 is reduced, making the structure of the optical imaging system more compact.

Further, the image source 2 and the lens assembly 3 are arranged in one dimension along a given direction.

Therefore, the image light generated by the image source can be incident on the first lens surface of the lens assembly at an appropriate angle, and then reach the first reflective surface after passing through the lens assembly, so that the imaging quality of the optical system of the present disclosure can be improved.

The third reflective surface is arranged in two dimensions relative to the image source and the lens assembly.

Therefore, the third reflective surface completely reflects the image light generated by the image source so that the image light generated by the image source is all incident to the lens assembly, making the structure of the optical system having a free-form surface of the present disclosure more compact.

Further, the first lens and the second lens of the lens assembly are connected to each other through gluing. Therefore, errors caused by assembly and alignment of the optical imaging system having a free-form surface of the present disclosure can be reduced.

Further, the second reflective surface and the third reflective surface are connected to each other through splicing. Therefore, errors caused by assembly and alignment of the optical imaging system having a free-form surface of the present disclosure can be reduced.

In Embodiment 1 of the present disclosure, a full field of view reaches 30°, and a focal power ratio of the lens assembly 3 to the entire system ranges from 61.20% to 70.60%. Referring to Table 1, in Embodiment 1 of the present disclosure, some structural parameters of the optical system are exemplarily listed.

TABLE 1

Parameters of the lens assembly 3.

| Lens | Surface | Type | Decentration reference | Y decentration | Z decentration | Alpha tilt |
|---|---|---|---|---|---|---|
| First lens 4 | Surface 4A | Aspheric | Aperture stop | 13.56 | 22.85 | −4.41 |
| | Surface 4B | Aspheric | | | | |
| Second lens 5 | Surface 5A | Aspheric | | | | |
| | Surface 5B | Aspheric | | | | |

Aspheric coefficients of the lens assembly 3.

| | Surface 4A | Surface 4B | Surface 5A | Surface 5B |
|---|---|---|---|---|
| R | −6.4343 | 6.0457 | 7.2239 | 44.9491 |
| K | 0 | 0 | 0 | 0 |
| A | 0.0002 | −0.0076 | −0.0052 | 0.0001 |
| B | −8.7340e−006 | 0.0007 | 0.0007 | 1.1350e−006 |
| C | 4.2383e−008 | −4.8660e−005 | −5.6264e−005 | −4.0974e−006 |
| D | 6.4033e−008 | 1.6268e−006 | 2.2397e−006 | 2.8253e−007 |
| E | −2.4018e−009 | −2.127e−008 | −3.3498e−008 | −6.4160e−009 |

The pupil of the human eye has a diameter of about 2 mm in a normal state and dilates in the dark. Different wearing habits can lead to different wearing positions. To ensure the comfort and accurate display during wearing, an exit pupil diameter of the optical imaging system of the head-mounted display is preferably set to 4 mm to 10 mm. In Embodiment 1 of the present disclosure, the exit pupil diameter is 7.8 mm.

To ensure that the head-mounted display is comfortable to wear, the exit pupil distance of the optical imaging system of the head-mounted display of the present disclosure is greater than 10 mm. In Embodiment 1 of the present disclosure, the exit pupil distance is 12.3 mm.

Figure 3:
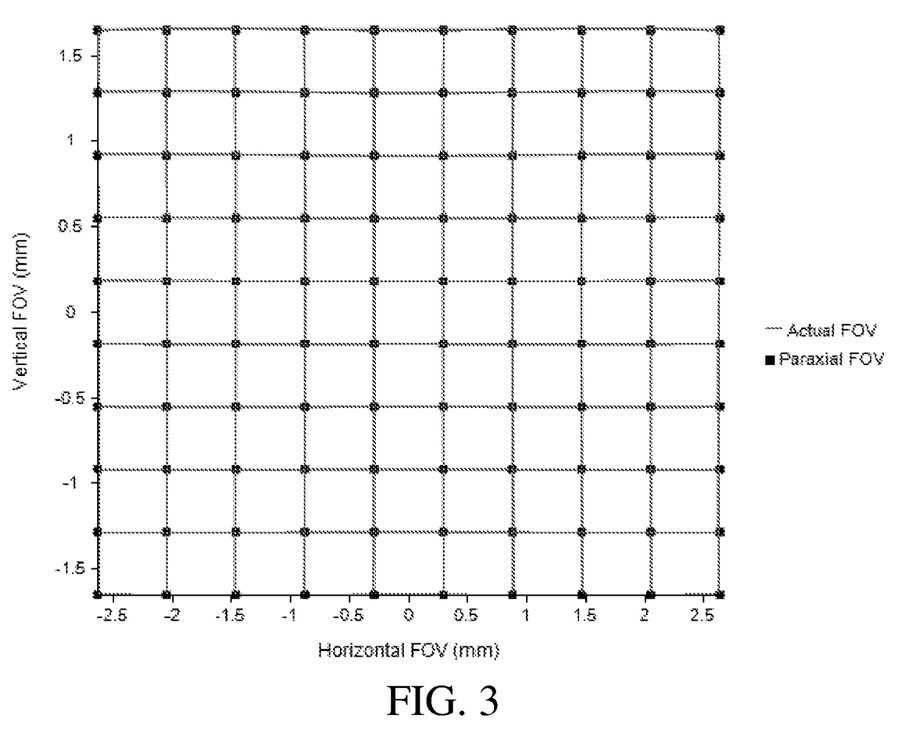
FIG. 3 is a distortion grid chart of the optical imaging system shown in FIG. 1.
Figure 4:
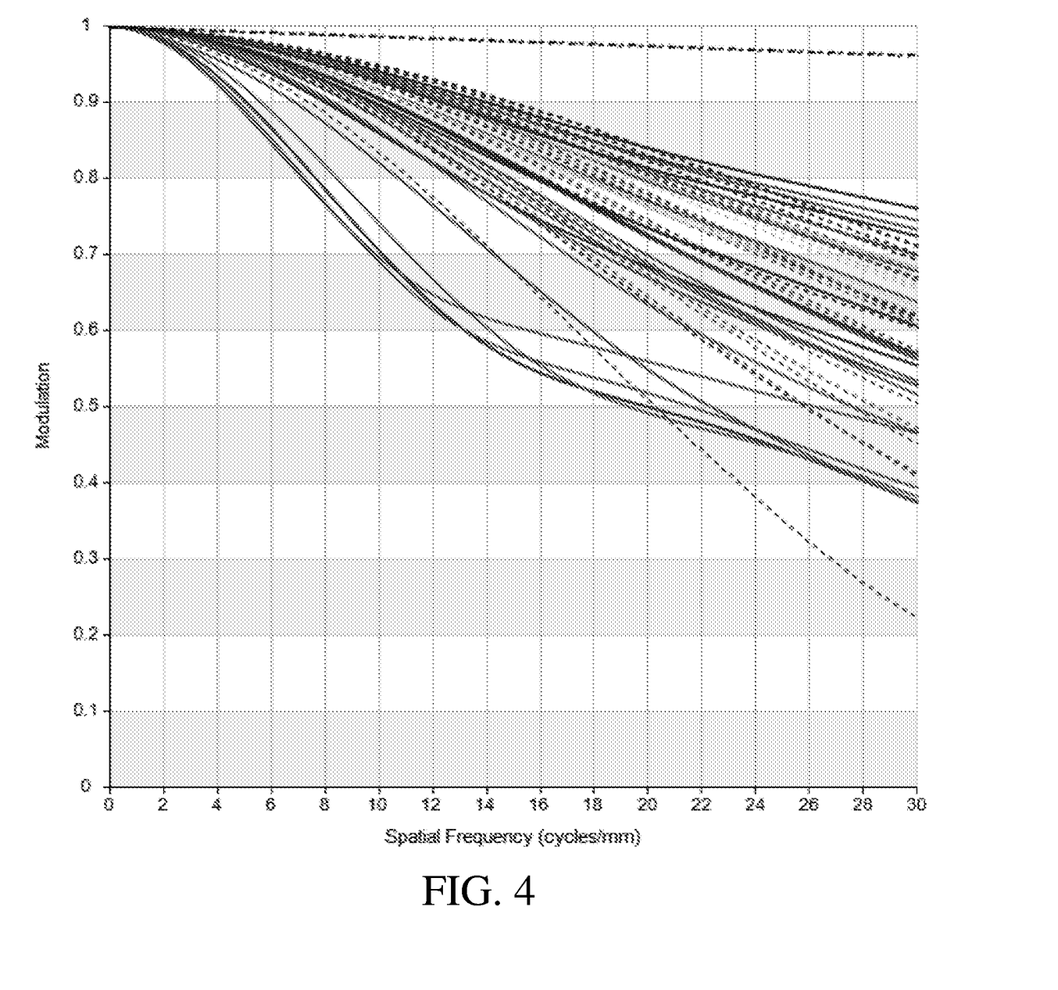
FIG. 4 is a modulation transfer function (MTF) frequency response curve of the optical imaging system shown in FIG. 1.
Figure 5:
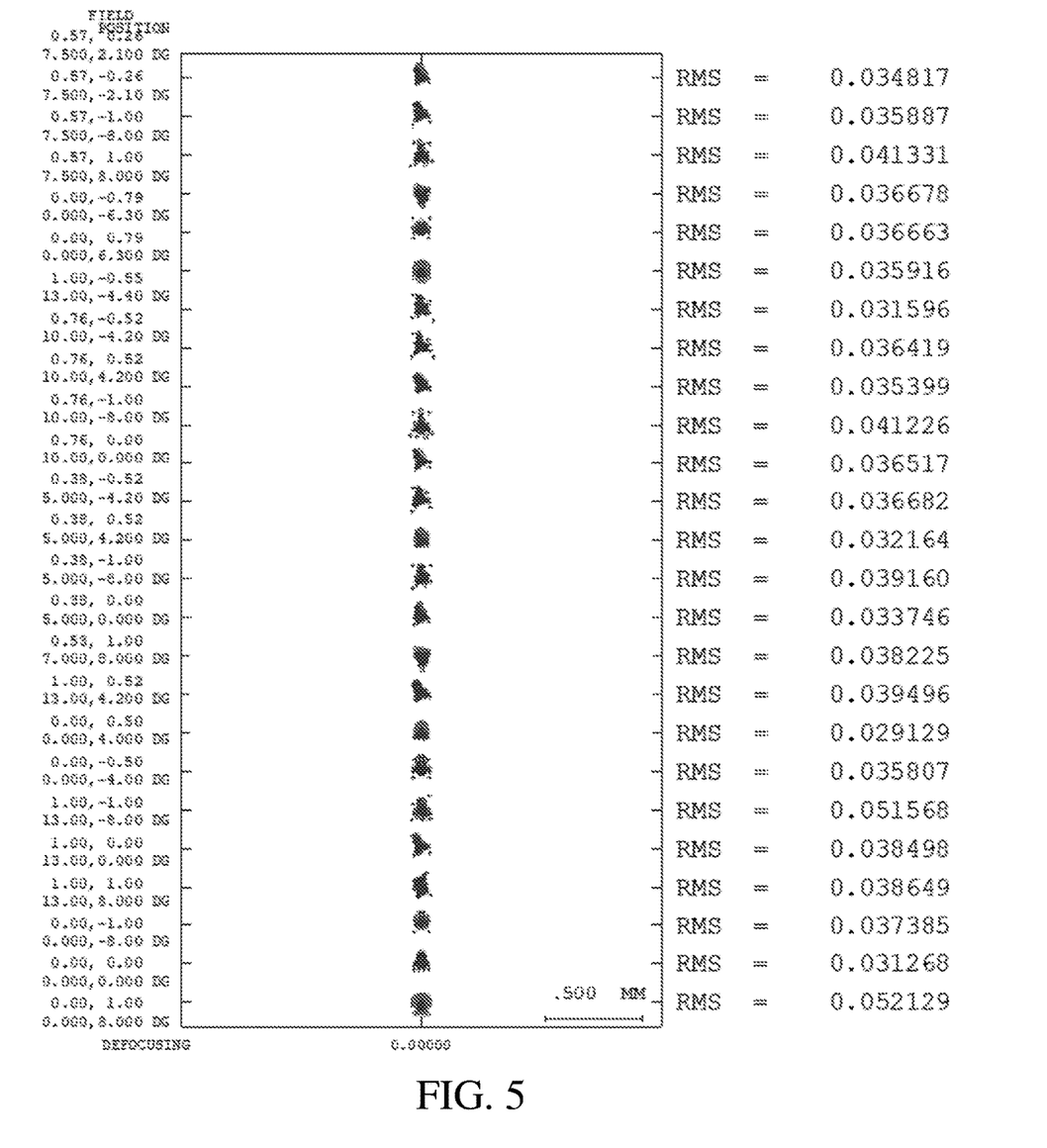
FIG. 5 is a spot diagram at different fields of view of the optical imaging system shown in FIG. 1.

FIGS. 3-5 are respectively a distortion grid chart, a modulation transfer function (MTF) frequency response curve, and a spot diagram at different fields of view of the optical imaging system having a free-form surface shown in Embodiment 1 of the present disclosure. It can be seen that the optical imaging system having a free-form surface mirror of this embodiment has small distortion in the full field of view, the MTF at a spatial frequency of 30 line pairs/mm is higher than 0.2, and spot sizes are evenly distributed in different fields of view and do not exceed 0.053 mm.

Embodiment 2

Figure 6:
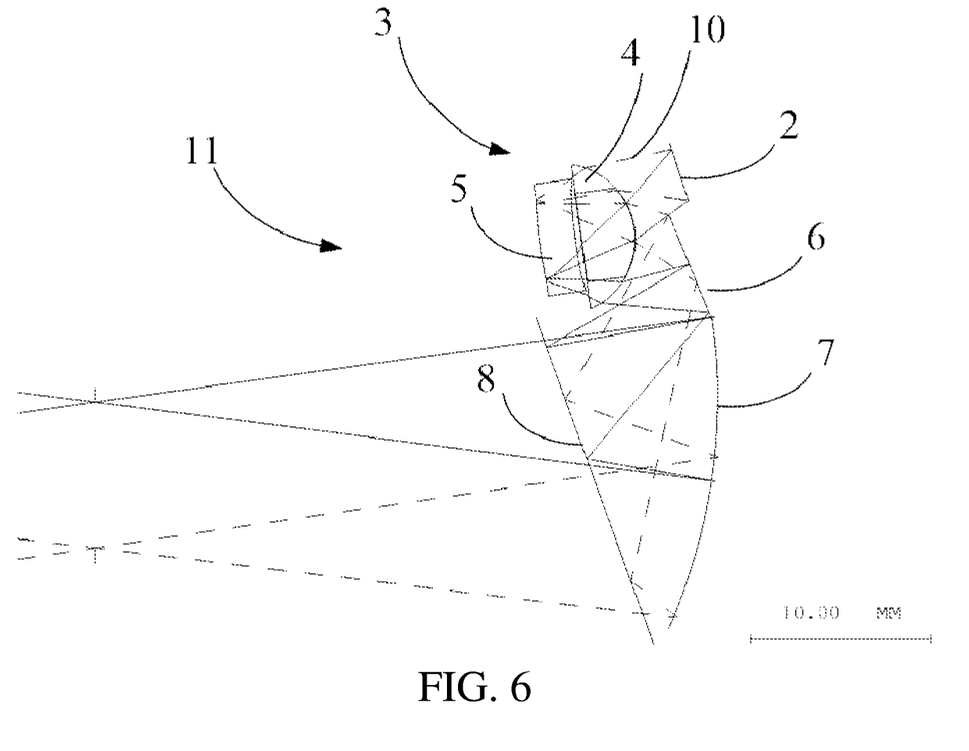
FIG. 6 is an optical path diagram of an optical imaging system having a free-form surface according to Embodiment 2 of the present disclosure.

FIG. 6 is an optical path diagram of an optical imaging system having a free-form surface according to Embodiment 2 of the present disclosure.

Different from Embodiment 1, the optical imaging system 11 does not include the third reflective surface 9, and the image light generated by the image source 2 is directly incident to the lens assembly 3 without passing through the reflective surface.

The remaining parts are the same as those of the optical imaging system 1 in Embodiment 1.

In Embodiment 2 of the present disclosure, a full field of view of the optical system not including the third reflective surface 9 can still reach 30°, and a focal power ratio of the lens assembly 3 to the entire system ranges from 1.2 to 1.5. Referring to Table 2, in Embodiment 2 of the present disclosure, some structural parameters of the optical system are exemplarily listed.

TABLE 2

Parameters of the lens assembly 3.

| Lens | Surface | Type | Decentration reference | Y decentration | Z decentration | Alpha tilt |
|---|---|---|---|---|---|---|
| First lens 4 | Surface 4A | Aspheric | Aperture stop | 13.48 | 29.84 | 7.54 |
| | Surface 4B | Aspheric | | | | |
| Second lens 5 | Surface 5A | Aspheric | | | | |
| | Surface 5B | Aspheric | | | | |

Aspheric coefficients of the lens assembly 3.

| | Surface 4A | Surface 4B | Surface 5A | Surface 5B |
|---|---|---|---|---|
| R | −4.0916 | 339.0525 | 72.1838 | 21.4714 |
| K | 0 | 0 | 0 | 0 |

TABLE 2-continued

| | | | | |
|---|---|---|---|---|
| A | −8.15823e−005 | −0.0013 | 0.0014 | 0.0003 |
| B | 0.0002 | 0.0002 | 0.0001 | −0.0007 |
| C | −2.1221e−005 | 6.0504e−008 | −1.0426e−005 | 0.0003 |
| D | 1.4426e−006 | −7.1997e−007 | −5.6627e−007 | −5.3491e−005 |
| E | −3.6794e−008 | 2.5412e−008 | 3.8413e−008 | 3.4234e−006 |

Embodiment 3

Figure 7:
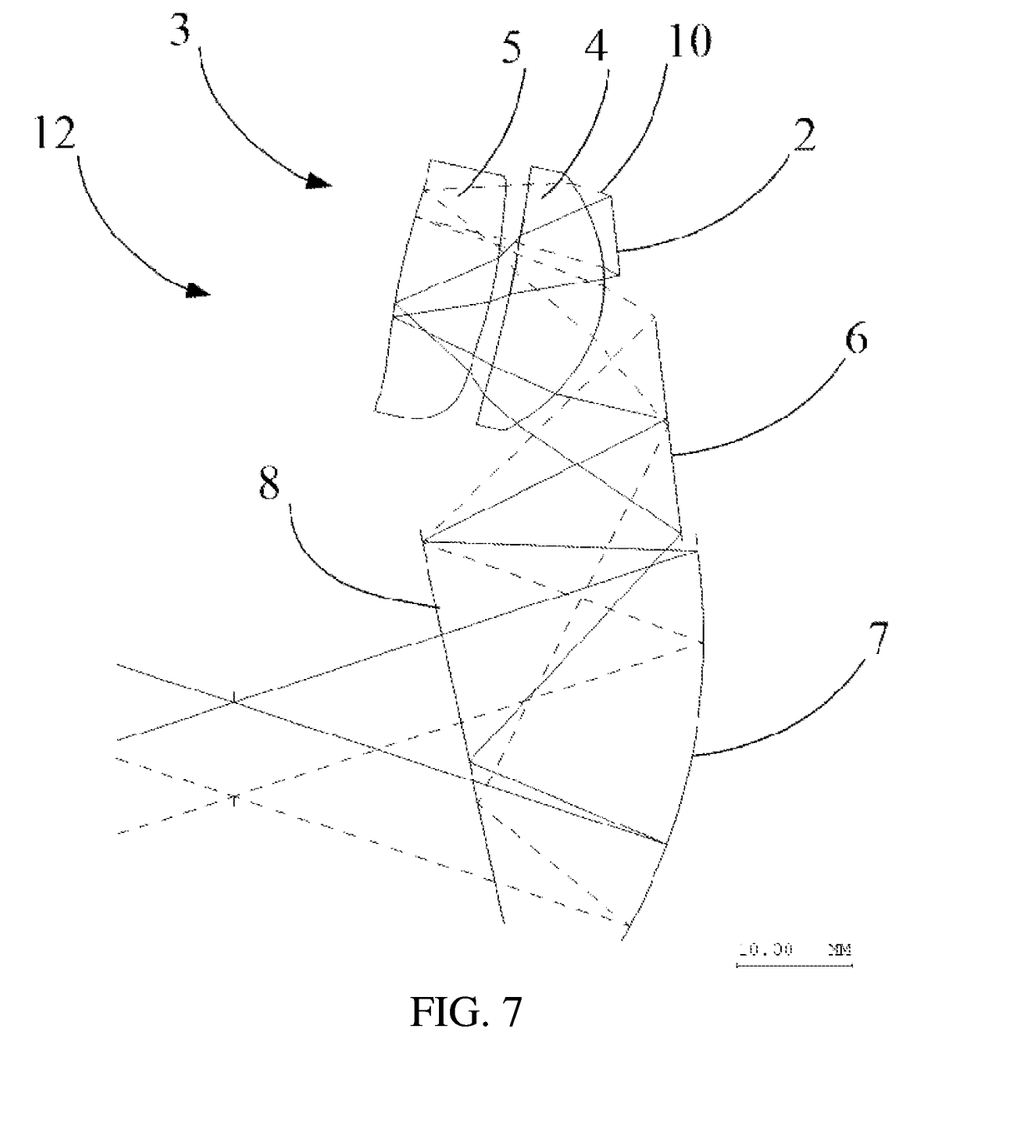
FIG. 7 is an optical path diagram of an optical imaging system having a free-form surface according to Embodiment 3 of the present disclosure.

FIG. 7 is an optical path diagram of an optical imaging system having a free-form surface according to Embodiment 3 of the present disclosure.

The structural form of the optical imaging system 12 is the same as that of the optical imaging system 11 in Embodiment 2, but the angle between the first optical axis direction and the second optical axis direction is greater than those in Embodiment 1 and Embodiment 2.

In Embodiment 3 of the present disclosure, because the angle between the first optical axis direction and the second optical axis direction changes, a full field of view of the system reaches 60°. Correspondingly, an exit pupil distance of the optical imaging system 12 is less than that of the optical imaging system 11 in Embodiment 2, and a focal power ratio of the lens assembly 3 to the entire system ranges from 2.87 to 3.35. Referring to Table 3, in Embodiment 3 of the present disclosure, some structural parameters of the optical system are exemplarily listed.

TABLE 3

Parameters of the lens assembly 3.

| Lens | Surface | Type | Decentration reference | Y decentration | Z decentration | Alpha tilt |
|---|---|---|---|---|---|---|
| First lens 4 | Surface 4A | Aspheric | Aperture stop | 37.17 | 31.49 | −12.14 |
| | Surface 4B | Aspheric | | | | |
| Second lens 5 | Surface 5A | Aspheric | | | | |
| | Surface 5B | Aspheric | | | | |

Aspheric coefficients of the lens assembly 3.

| | Surface 4A | Surface 4B | Surface 5A | Surface 5B |
|---|---|---|---|---|
| R | −12.5470 | −148.4657 | −39.0178 | 60.0267 |
| K | 0 | 0 | 0 | 0 |
| A | 3.1125e−005 | −2.0560e−005 | 1.6506e−005 | −1.4903e−005 |
| B | 1.6570e−008 | 6.9417e−007 | 1.4453e−006 | 1.0558e−007 |
| C | 2.9746e−009 | −5.6090e−009 | −1.5011e−008 | −3.0624e−009 |

Embodiment 4

Figure 8:
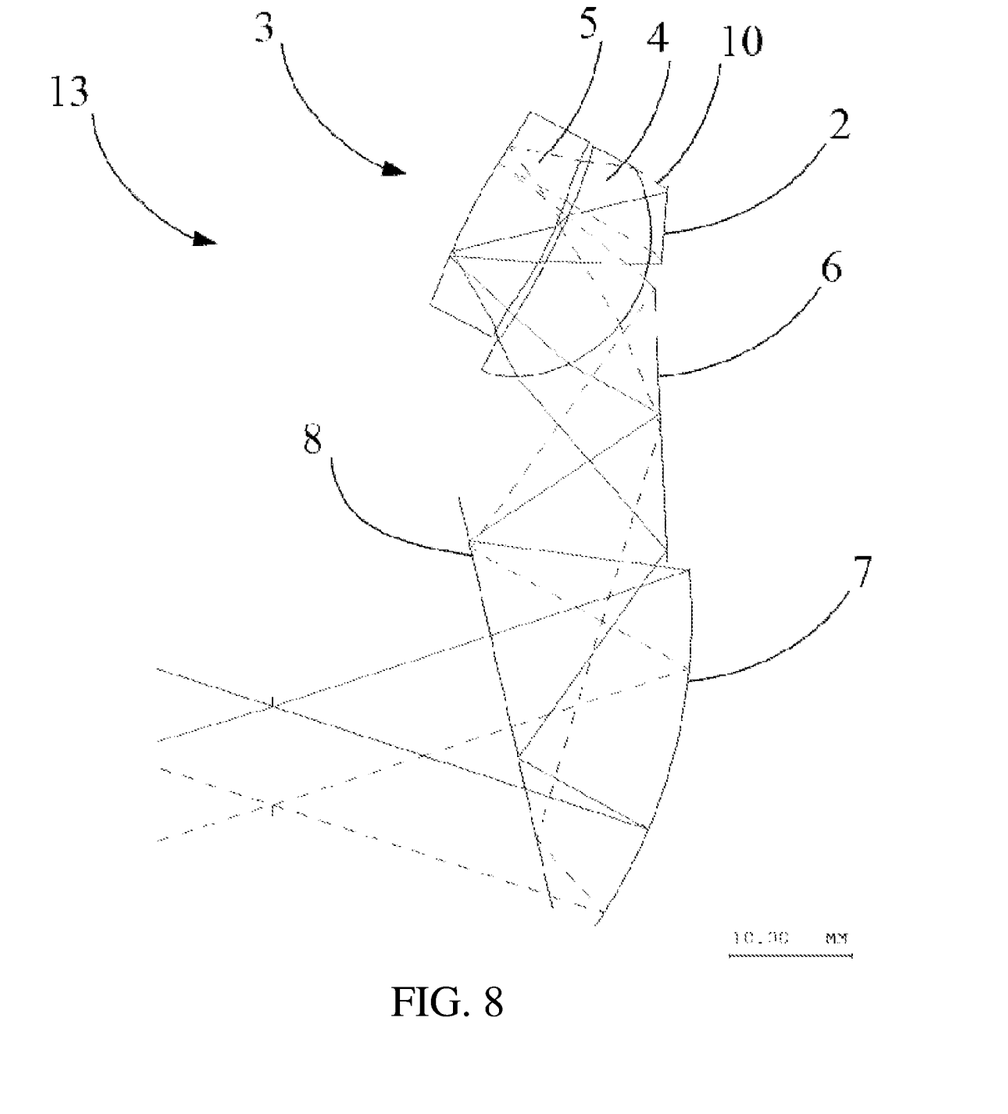
FIG. 8 is an optical path diagram of an optical imaging system having a free-form surface according to Embodiment 4 of the present disclosure.

FIG. 8 is an optical path diagram of an optical imaging system having a free-form surface according to Embodiment 4 of the present disclosure.

The structural form of the optical imaging system 13 is the same as that of the optical imaging system 11 in Embodiment 2, but the angle between the first optical axis direction and the second optical axis direction is significantly greater than those in Embodiment 1 and Embodiment 2, and is close to 45 degrees.

In Embodiment 4 of the present disclosure, a full field of view also reaches 60°. Correspondingly, an exit pupil distance of the optical imaging system 13 is less than that of the optical imaging system 11 in Embodiment 2, and a focal power ratio of the lens assembly 3 to the entire system ranges from 42.76% to 54.64%. Referring to Table 4, in Embodiment 4 of the present disclosure, some structural parameters of the optical system are exemplarily listed.

TABLE 4

Parameters of the lens assembly 3.

| Lens | Surface | Type | Decentration reference | Y decentration | Z decentration | Alpha tilt |
|---|---|---|---|---|---|---|
| First lens 4 | Surface 4A | Aspheric | Aperture stop | 37.03 | 29.68 | −27.23 |

TABLE 4-continued

| | | |
|---|---|---|
| | Surface 4B | Aspheric |
| Second lens 5 | Surface 5A | Aspheric |
| | Surface 5B | Aspheric |

Aspheric coefficients of the lens assembly 3.

| | Surface 4A | Surface 4B | Surface 5A | Surface 5B |
|---|---|---|---|---|
| R | −11.0379 | −110.8166 | −29.5132 | 48.3393 |
| K | 0 | 0 | 0 | 0 |
| A | −8.15823e−005 | −0.0013 | 0.0014 | 0.0003 |
| B | 0.0002 | 0.0002 | 0.0001 | −0.0007 |
| C | −2.1221e−005 | 6.0504e−008 | −1.0426e−005 | 0.0003 |
| D | 1.4426e−006 | −7.1997e−007 | −5.6627e−007 | −5.3491e−005 |
| E | −3.6794e−008 | 2.5412e−008 | 3.8413e−008 | 3.4234e−006 |

The present disclosure is set forth above by using Embodiment 1, Embodiment 2, Embodiment 3, and Embodiment 4.

According to the optical system of the present disclosure, the overall optical imaging system has a negative focal power, and presents an enlarged virtual image to an observer. An image provided by a micro-image source may be projected to a line-of-sight direction of the observer at a field of view of at least 30 degrees. The lens assembly 3 with a positive focal power includes a positive refractive lens and a negative refractive lens. The second reflective surface 7 is of a free-form type and has a positive focal power.

The present disclosure further discloses a head-mounted display device, which includes the optical imaging system described in any one of Embodiment 1 to Embodiment 4, and can work in a VR mode that provides only virtual images, or in an AR mode that provides both virtual images and real images.

The head-mounted display device includes an image source 2 for emitting image light to the optical imaging system, and other components (not shown) such as a tracking camera for determining a line-of-sight position or a depth camera for determining a virtual image projection position.

The image source 2 may be selected from one of an organic light-emitting diode (OLED) display, a backlit liquid-crystal display (LCD) display, a micro light-emitting diode (LED) display, a plasma display, and a digital light processing (DLP) display. For miniaturization, such a display usually has a diagonal length of no more than 3 inches and has high definition of resolution to ensure that an image projected through the optical system maintains fine image quality. The image source 2 may be, for example, as shown in FIG. 1 of the present disclosure. The third reflective surface 9 is disposed between the image source 2 and the lens assembly 3. The third reflective surface 9 is configured to reflect the image light 10 emitted by the image source 2 into the lens assembly 3. By use of the third reflective surface, the positions of optical devices can be adjusted more flexibly to make full use of space, and the distance between the image source 2 and the lens assembly 3 is reduced, making the structure of the optical imaging system more compact.

In this case, the image source 2 and the lens assembly 3 are arranged in one dimension along a given direction.

Therefore, the image light generated by the image source can be incident on the first lens surface of the lens assembly at an appropriate angle, and then exits to the first reflective surface after passing through the lens assembly, so that the imaging quality of the optical system having a free-form surface of the present disclosure can be improved.

The third reflective surface is arranged in two dimensions relative to the image source and the lens assembly.

Therefore, the third reflective surface completely reflects the image light generated by the image source, so that the image light generated by the image source is all incident to the lens assembly, making the structure of the optical system having a free-form surface of the present disclosure more compact.

The second reflective surface and the third reflective surface are connected to each other through splicing. Therefore, errors caused by assembly and alignment of the optical imaging system having a free-form surface of the present disclosure can be reduced.

Alternatively, the optical imaging system 11 may not include the third reflective surface 9, and the image light generated by the image source 2 is directly incident to the lens assembly 3 without passing through the reflective surface. Specifically, refer to FIG. 6 of Embodiment 2.

When the head-mounted display device of the present disclosure works in the VR mode, the second reflective surface 7 has a reflectivity of 100% (in an ideal state) to utilize with maximum efficiency energy of the image light provided by the image source 2. When the head-mounted display device works in the AR mode, the second reflective surface 7 does not provide total reflection, but should have a predetermined transmission-reflection ratio, so that external ambient light is transmitted through the second reflective surface 7 and the beam splitter 8, and is mixed with the image light provided by the image source 2, to generate a virtual/real hybrid image. Because neither the beam splitter 8 nor the second reflective surface 7 has refractive power to the ambient light, the transmitted ambient light is normally imaged at the user's eyes.

According to the optical system of the present disclosure, an optical imaging system featuring low distortion, high image quality, and a compact structure can be provided for head-mounted displays by utilizing the refractive power of the lens assembly twice and at least one free-form reflective surface.

The foregoing is a further detailed description of the present disclosure made with reference to the specific preferred embodiments, and should not be construed as limiting the specific embodiments of the present disclosure. A person of ordinary skill in the art to which the present disclosure pertains can still make several simple modifications or replacements without departing from the concept of the present disclosure, and all such modifications or replacements should be considered as falling within the protection scope of the present disclosure as defined by the appended claims.

What is claimed is:

1. An optical imaging system, comprising:
a lens assembly having a first optical axis direction;
a first reflective surface;
a second reflective surface; and
a beam splitter, wherein the lens assembly comprises a front surface and a rear surface; the front surface is close to an image source; the rear surface has a reflective surface; image light from the image source is incident on the front surface and propagates to the rear surface; after being reflected by the rear surface, the image light propagates to the front surface; and after exiting from the front surface, the image light is incident on the first reflective surface; the first reflective surface is disposed opposite to the lens assembly, and is configured to reflect the image light exiting from the lens assembly; the beam splitter is disposed opposite to the first reflective surface, and is configured to transmit and reflect the image light incident thereon from the first reflective surface at a predetermined transmission-reflection split ratio; and the second reflective surface has a second optical axis direction, is disposed opposite to the beam splitter and located on the same side as the first reflective surface, and is configured to reflect the image light incident thereon from the beam splitter and cause the image light to be incident to the beam splitter again.

2. The optical imaging system according to claim 1, wherein
the lens assembly comprises a first lens and a second lens;
the first lens comprises a first lens surface and a second lens surface;
the second lens comprises a third lens surface and a fourth lens surface;
the front surface of the lens assembly is the first lens surface, the rear surface is the fourth lens surface, and the fourth lens surface is coated with a total reflection film as the reflective surface, or a rear side of the fourth lens surface is provided with a reflection plate as the reflective surface.

3. The optical imaging system according to claim 2, wherein
the first lens and the second lens are aspheric lenses.

4. The optical imaging system according to claim 3, wherein
the first lens and the second lens are connected to each other through gluing.

5. The optical imaging system according to claim 1, wherein
the second reflective surface is designed as a free-form surface, and an inner surface thereof facing the beam splitter is provided with a beam splitting layer with a predetermined transmission-reflection ratio to reflect the image light.

6. The optical imaging system according to claim 4, wherein
the first reflective surface is designed as a free-form surface or is a planar mirror.

7. The optical imaging system according to claim 4, wherein
an angle between the first optical axis direction and the second optical axis direction does not exceed 45 degrees.

8. The optical imaging system according to claim 7, wherein
the optical imaging system has an exit pupil diameter ranging from 4 mm to 10 mm and has an exit pupil distance greater than 10 mm.

9. The optical imaging system according to claim 1, wherein
the optical imaging system has a negative focal power;
the lens assembly with a positive focal power comprises a positive refractive lens and a negative refractive lens; and
the second reflective surface has a positive focal power.

10. A head-mounted display device, comprising:
the optical imaging system according to claim 1 and an image source for emitting image light to the optical imaging system.

11. The head-mounted display device according to claim 10, wherein
a third reflective surface exists between the image source and the lens assembly; and
the third reflective surface is configured to reflect the image light emitted by the image source into the lens assembly.

12. The head-mounted display device according to claim 10, wherein
the image source and the lens assembly are arranged in one dimension along a given direction.

13. The head-mounted display device according to claim 11, wherein
the third reflective surface is arranged in two dimensions relative to the image source and the lens assembly.

14. The head-mounted display device according to claim 11, wherein
the second reflective surface and the third reflective surface are connected together through splicing.

15. The head-mounted display device according to claim 10, wherein the image source is one selected from the group consisting of an organic light-emitting diode (OLED) display, a backlit liquid-crystal display (LCD) display, a micro light-emitting diode (LED) display, a plasma display, and a digital light processing (DLP) display.

16. The optical imaging system according to claim 2, wherein
the second reflective surface is designed as a free-form surface, and an inner surface thereof facing the beam splitter is provided with a beam splitting layer with a predetermined transmission-reflection ratio to reflect the image light.

17. The optical imaging system according to claim 8, wherein
the optical imaging system has a negative focal power;
the lens assembly with a positive focal power comprises a positive refractive lens and a negative refractive lens; and
the second reflective surface has a positive focal power.

18. A head-mounted display device, comprising:
the optical imaging system according to claim 9 and an image source for emitting image light to the optical imaging system.

19. The head-mounted display device according to claim 18, wherein
a third reflective surface exists between the image source and the lens assembly; and the third reflective surface is configured to reflect the image light emitted by the image source into the lens assembly.

20. The head-mounted display device according to claim 18, wherein
the image source and the lens assembly are arranged in one dimension along a given direction.

* * * * *

UNITED STATES PATENT AND TRADEMARK OFFICE
CERTIFICATE OF CORRECTION

| | | |
|---|---|---|
| PATENT NO. | : 10,983,317 B2 | |
| APPLICATION NO. | : 16/336459 | |
| DATED | : April 20, 2021 | |
| INVENTOR(S) | : Dewen Cheng and Qiwei Wang | |

It is certified that error appears in the above-identified patent and that said Letters Patent is hereby corrected as shown below:

On the Title Page

Item (73) should read:
BEIJING NED+AR DISPLAY TECHNOLOGY CO., LTD.,

Signed and Sealed this
Third Day of May, 2022

Katherine Kelly Vidal
*Director of the United States Patent and Trademark Office*